United States Patent
Cheng et al.

(10) Patent No.: US 11,656,401 B2
(45) Date of Patent: May 23, 2023

(54) BACK PLATE UNIT AND BACKLIGHT MODULE OF DISPLAY DEVICE

(71) Applicant: Top Victory Investments Limited, Hong Kong (HK)

(72) Inventors: Hung-Chi Cheng, New Taipei (TW); Chien-Lung Huang, New Taipei (TW); Chia-Chang Tsai, New Taipei (TW); Chih-Yuan Sung, New Taipei (TW)

(73) Assignee: TOP VICTORY INVESTMENTS LIMITED, Hong Kong (HK)

( * ) Notice: Subject to any disclaimer, the term of this patent is extended or adjusted under 35 U.S.C. 154(b) by 0 days.

(21) Appl. No.: 17/879,622

(22) Filed: Aug. 2, 2022

(65) Prior Publication Data
US 2023/0077713 A1     Mar. 16, 2023

(30) Foreign Application Priority Data
Sep. 16, 2021     (TW) .................................. 110134631

(51) Int. Cl.
*F21V 8/00*     (2006.01)
(52) U.S. Cl.
CPC .................................. *G02B 6/0073* (2013.01)
(58) Field of Classification Search
CPC .. G02B 6/1203; G02B 6/0011; G02B 6/0031; G02B 6/0086; G02B 7/008
See application file for complete search history.

(56) References Cited

U.S. PATENT DOCUMENTS

| 10,488,581 B2 * | 11/2019 | Xu ..................... G02F 1/133608 |
| 10,908,352 B1 * | 2/2021 | Chen ..................... G02B 6/0088 |

FOREIGN PATENT DOCUMENTS

| CN | 103423610 A | 12/2013 |
| CN | 103982868 A | 8/2014 |

OTHER PUBLICATIONS

Machine translation of CN103982868 (Year: 2014).*
Search Report appended to an Office Action, which was issued to Taiwanese counterpart application No. 110134631 by the TIPO dated Apr. 29, 2022, with an English translation thereof (2 pages).

* cited by examiner

*Primary Examiner* — Leah Simone Macchiarolo
(74) *Attorney, Agent, or Firm* — Hamre, Schumann, Mueller & Larson, P.C.

(57) ABSTRACT

A back plate unit includes a back plate having opposite first and second sides, an optical member mounted to the back plate, and a buffer assembly disposed between the optical member and the back plate and including at least one first buffer member disposed on the first side and made of a thermoplastic material, and at least one second buffer member disposed on the second side and made of a thermoset material. The at least one first buffer member and the optical member are deformed when heated, and the at least one first buffer member is squeezed and compressed by expansion of the optical member. A backlight module of a display device is also disclosed.

11 Claims, 14 Drawing Sheets

FIG.14

BACK PLATE UNIT AND BACKLIGHT MODULE OF DISPLAY DEVICE

CROSS-REFERENCE TO RELATED APPLICATION

This application claims priority to Taiwanese Application No. 110134631, filed on Sep. 16, 2021.

FIELD

The disclosure relates to a back plate unit and a backlight module of a display device.

BACKGROUND

An existing backlight module of a display device includes a back plate, a light guide plate, a plurality of light emitting diodes (LED) for emitting light toward the light guide plate, and a plurality of rubber members disposed between the back plate and the light guide plate. Through the provision of the rubber members, the light guide plate can be positioned on the back plate, and the rubber members can absorb the vibration during transport to avoid damage to the light guide plate due to squeezing. In response to consumer demand for display device of different sizes, manufacturers have developed thermosetting rubber members to easily control the size thereof so as to meet different specifications of the back plates and the light guide plates.

However, when the light guide plate abuts against the rubber member located on a bottom side due to thermal expansion and elongation, and in order to avoid pressing the LED located on the bottom side, the remaining amount of the thermal expansion of the light guide plate is bound to extend only toward a top side. Thus, the rubber member located on the top side is bound to leave more gaps with the light guide plate. That is, under the condition that the size of the light guide plate is fixed, the size of the back plate needs to be increased, so that the screen-to-body ratio cannot be reduced.

SUMMARY

Therefore, an object of the present disclosure is to provide a back plate unit that is capable of increasing the screen-to-body ratio of a display device.

Accordingly, a back plate unit of this disclosure includes a back plate having opposite first and second sides, an optical member mounted to the back plate, and a buffer assembly disposed between the optical member and the back plate. The buffer assembly includes at least one first buffer member that is disposed on the first side of the back plate, that is located between the back plate and the optical member, and that is made of a thermoplastic material, and at least one second buffer member that is disposed on the second side of the back plate, that is located between the back plate and the optical member, and that is made of a thermoset material. The at least one first buffer member and the optical member are deformed when heated, and the at least one first buffer member is squeezed and compressed by expansion of the optical member.

Another object of the present disclosure is to provide a backlight module of a display device that is capable of increasing the screen-to-body ratio of the display device.

Accordingly, a backlight module of a display device of this disclosure includes the above-mentioned back plate unit, and a light emitting unit disposed on the second side of the back plate for emitting light toward the optical member.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
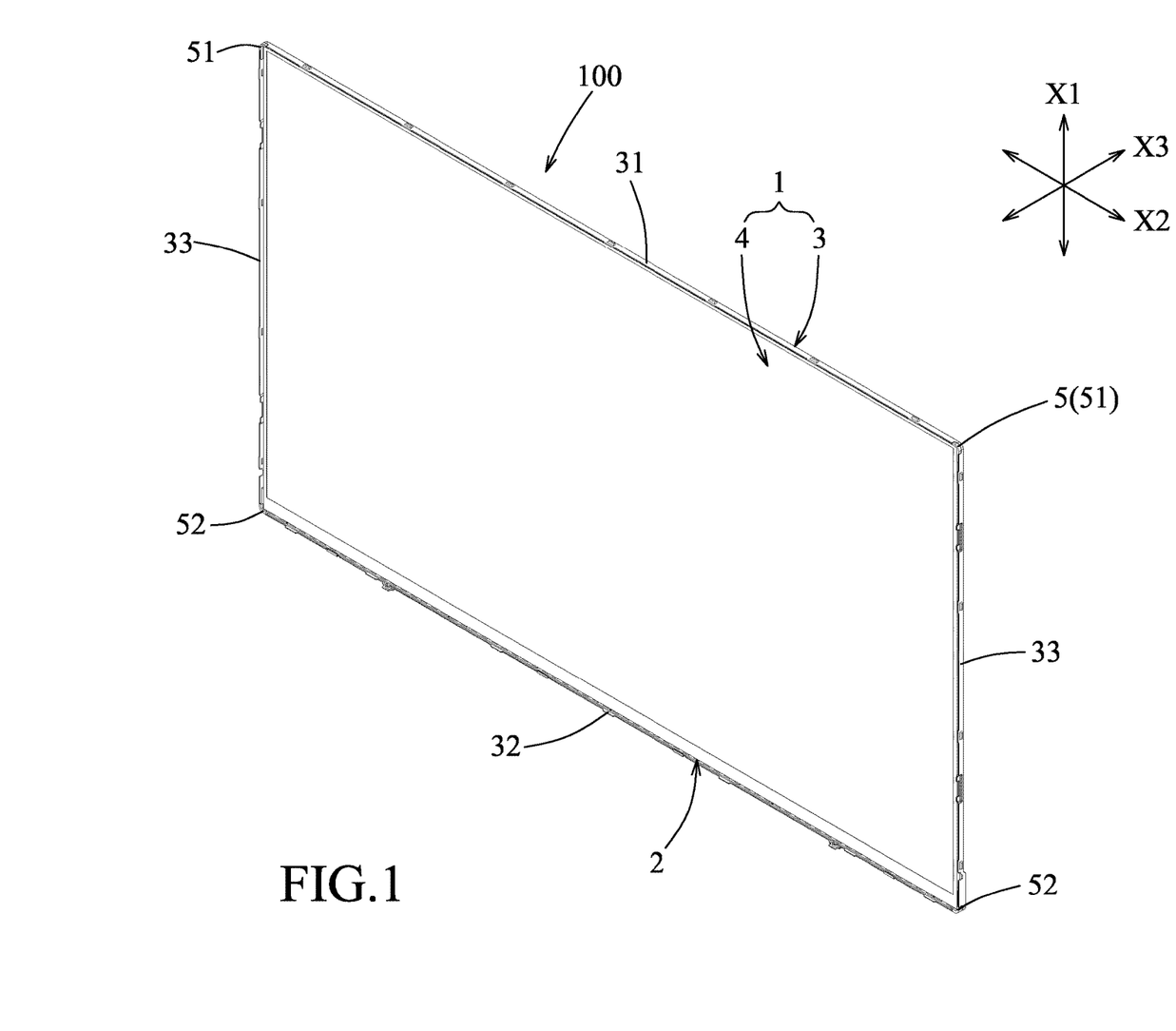
FIG. 1 is a perspective view of a backlight module of a display device according to an embodiment of the present disclosure.

Referring to FIG. 1, a backlight module 100 of a display device according to an embodiment of the present disclosure is shown to comprise a back plate unit 1 and a light emitting unit 2 disposed in the back plate unit 1.

In the description below, the first direction (X1) refers to a top-bottom direction as viewed from the front of the backlight module 100, the second direction (X2) refers to a left-right direction transverse to the first direction (X1), and the third direction (X3) refers to a front-rear direction transverse to the first and second directions (X1, X2).

Figure 2:
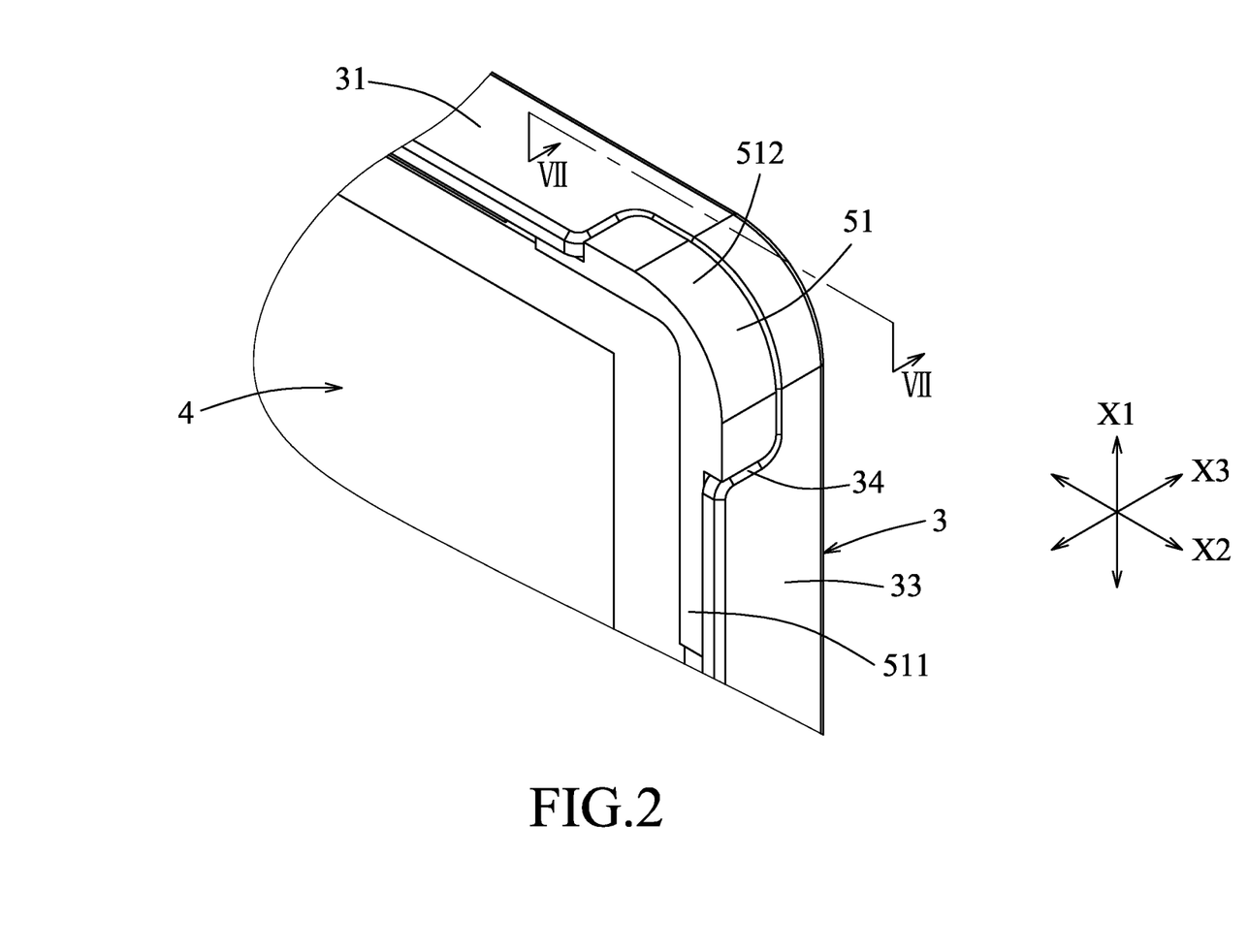
FIG. 2 is an enlarged fragmentary perspective view of an upper right corner of FIG. 1.
Figure 3:
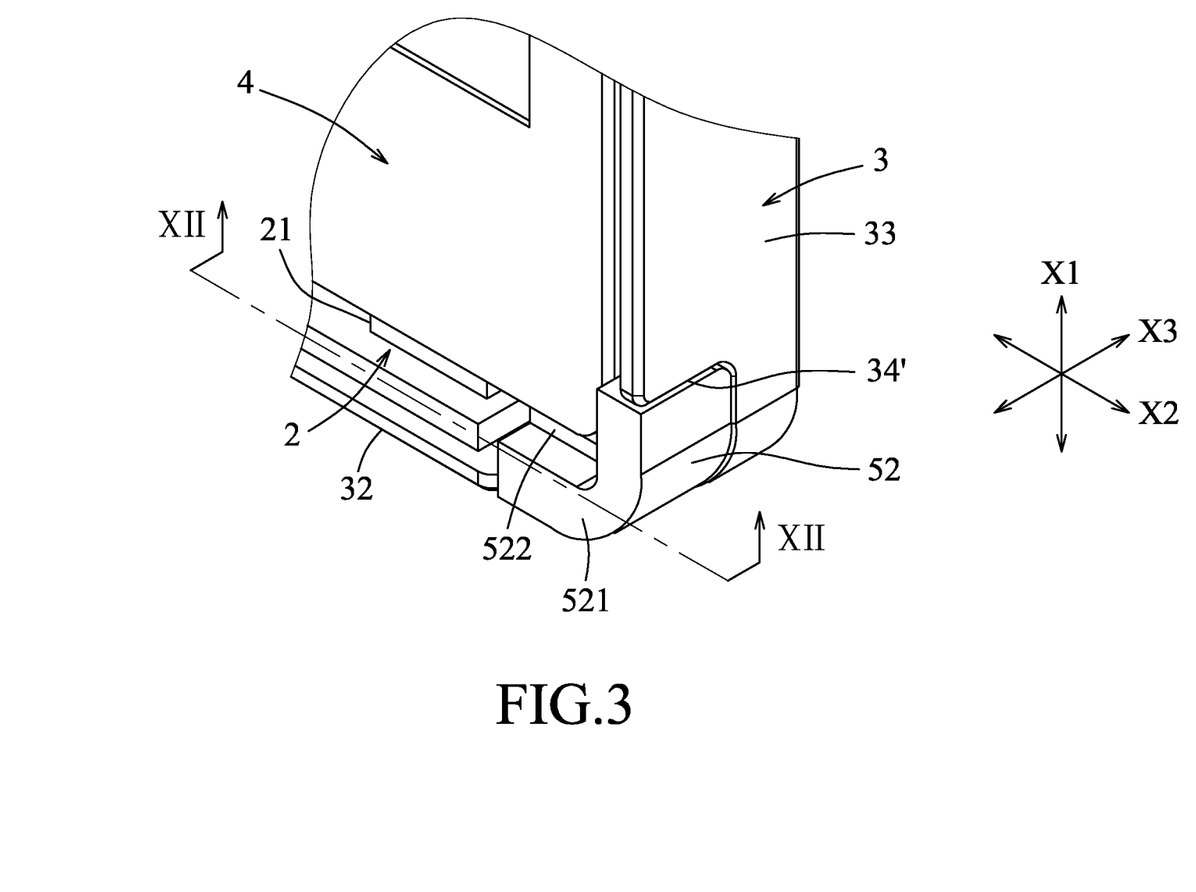
FIG. 3 is an enlarged fragmentary perspective view of a lower right corner of FIG. 1.
Figure 4:
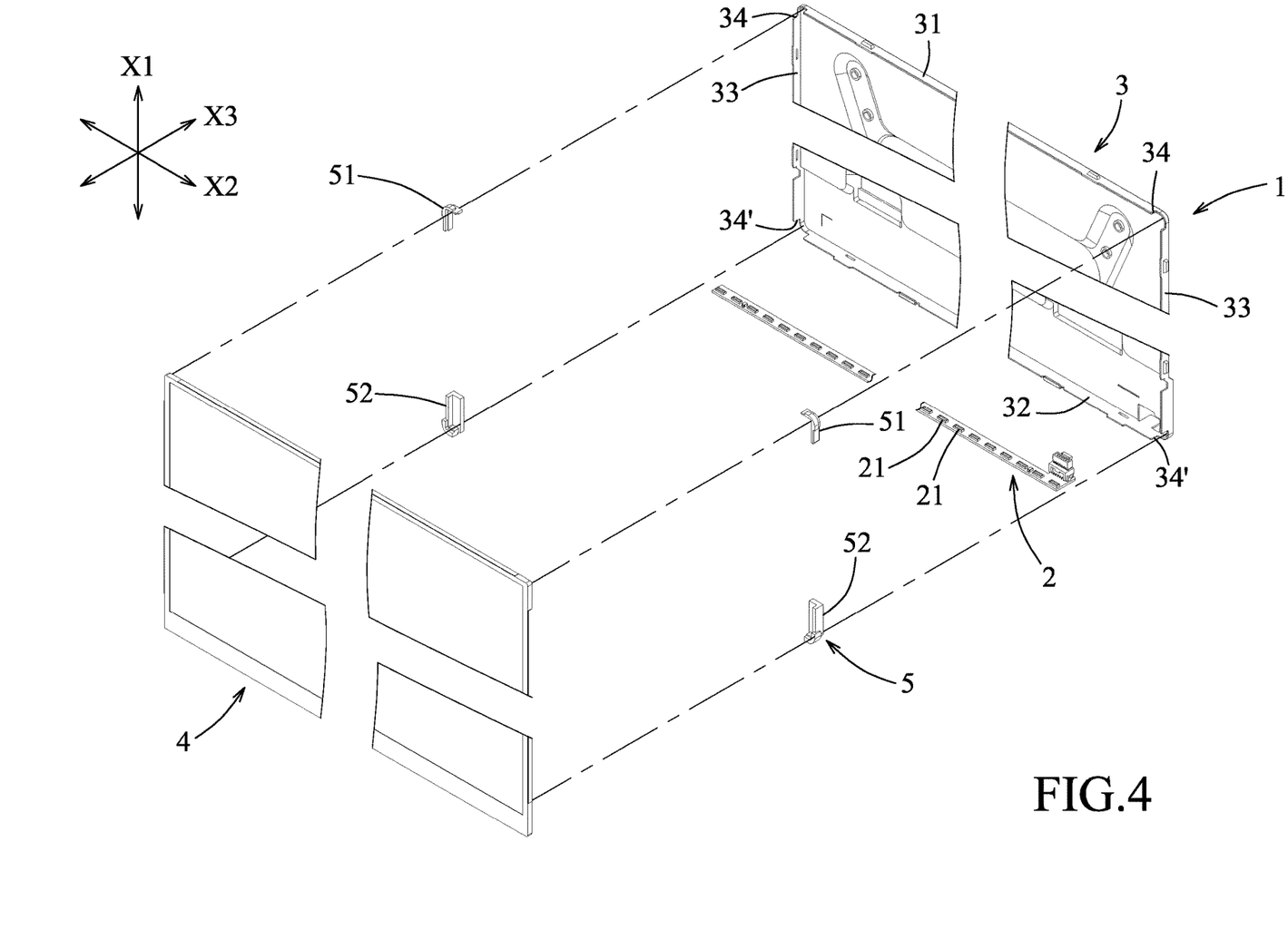
FIG. 4 is an exploded fragmentary perspective view of the embodiment.

Referring to FIGS. 2 to 4, the back plate unit 1 includes a back plate 3, an optical member 4 mounted on the back plate 3, and a buffer assembly 5 disposed between the optical member 4 and the back plate 3.

The back plate 3 of this embodiment is rectangular, and has a first side 31 and a second side 32 extending in the second direction (X2) and opposite to each other in the first direction (X1), two third sides 33 each of which extends in the first direction (X1) and each of which is connected between one end of the first side 31 and a corresponding end of the second side 32, and four recesses 34, 34' respectively formed at four corners of the back plate 3. Specifically, two recesses 34 are located on a top side of the back plate 3, while the other two recesses 34' are located on a bottom side of the back plate 3. Each recess 34 is formed at a junction of the first side 31 and a corresponding one of the third sides 33. Each recess 34' is formed at a junction of the second side 32 and a corresponding one of the third sides 33.

The optical member 4 can be, but is not limited to, a light guide plate, and is positioned on the back plate 3 in a conventional manner.

Figure 5:
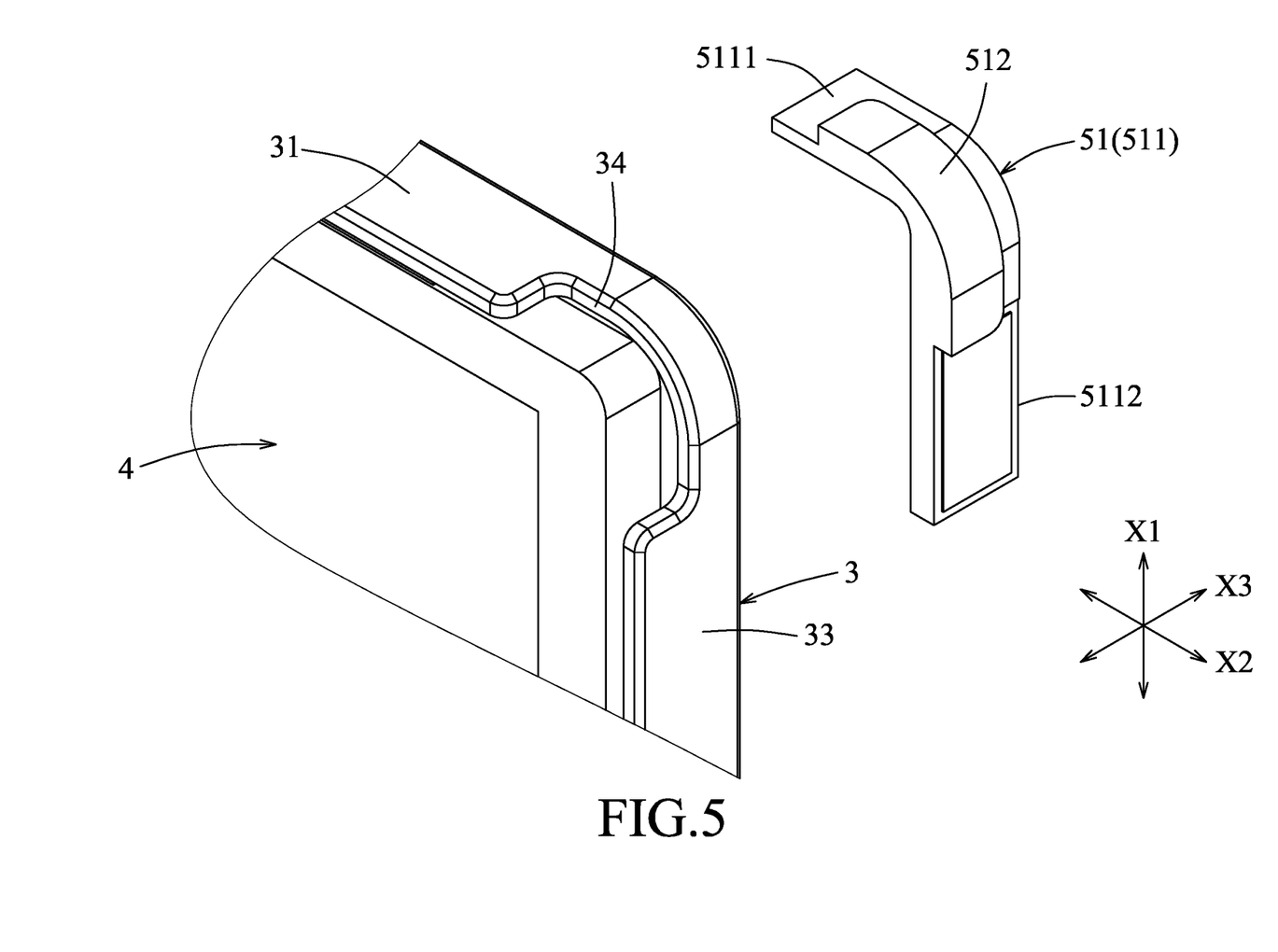
FIG. 5 is a view similar to FIG. 2, but with a first buffer member being removed for the sake of clarity.
Figure 6:
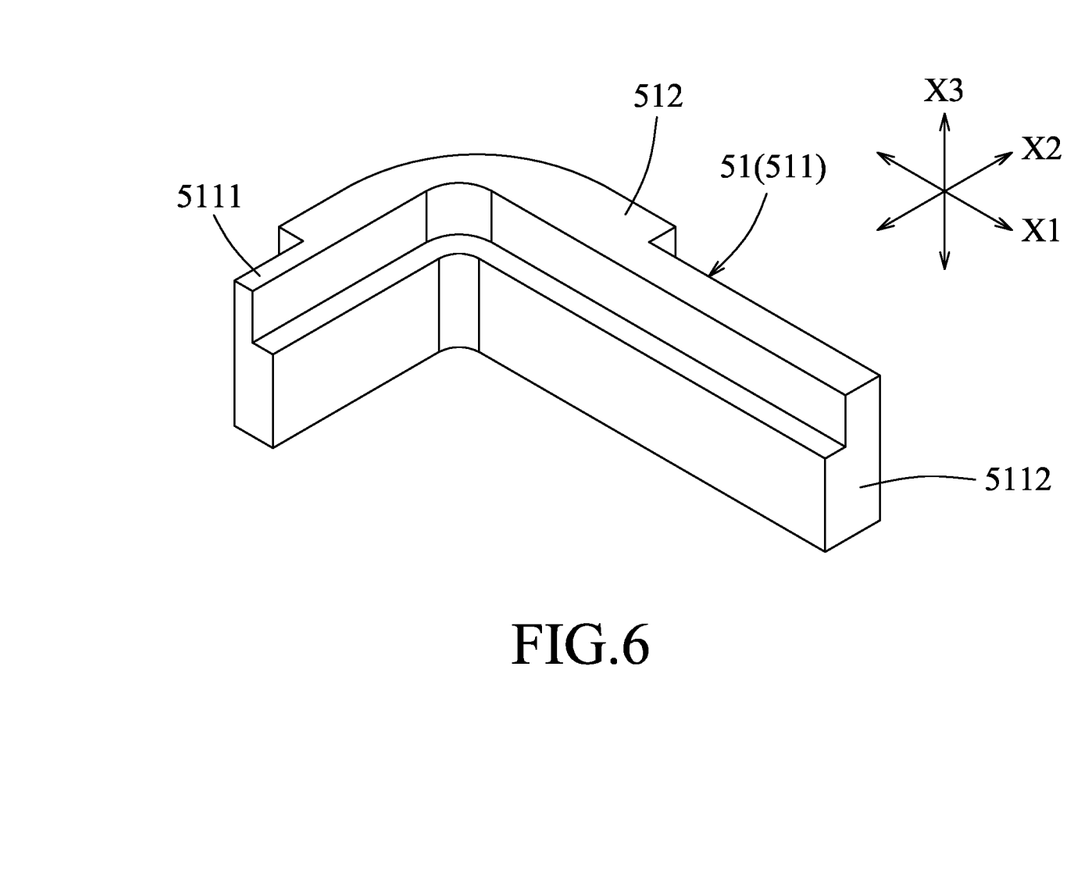
FIG. 6 is a perspective view of the first buffer member of the embodiment.
Figure 10:
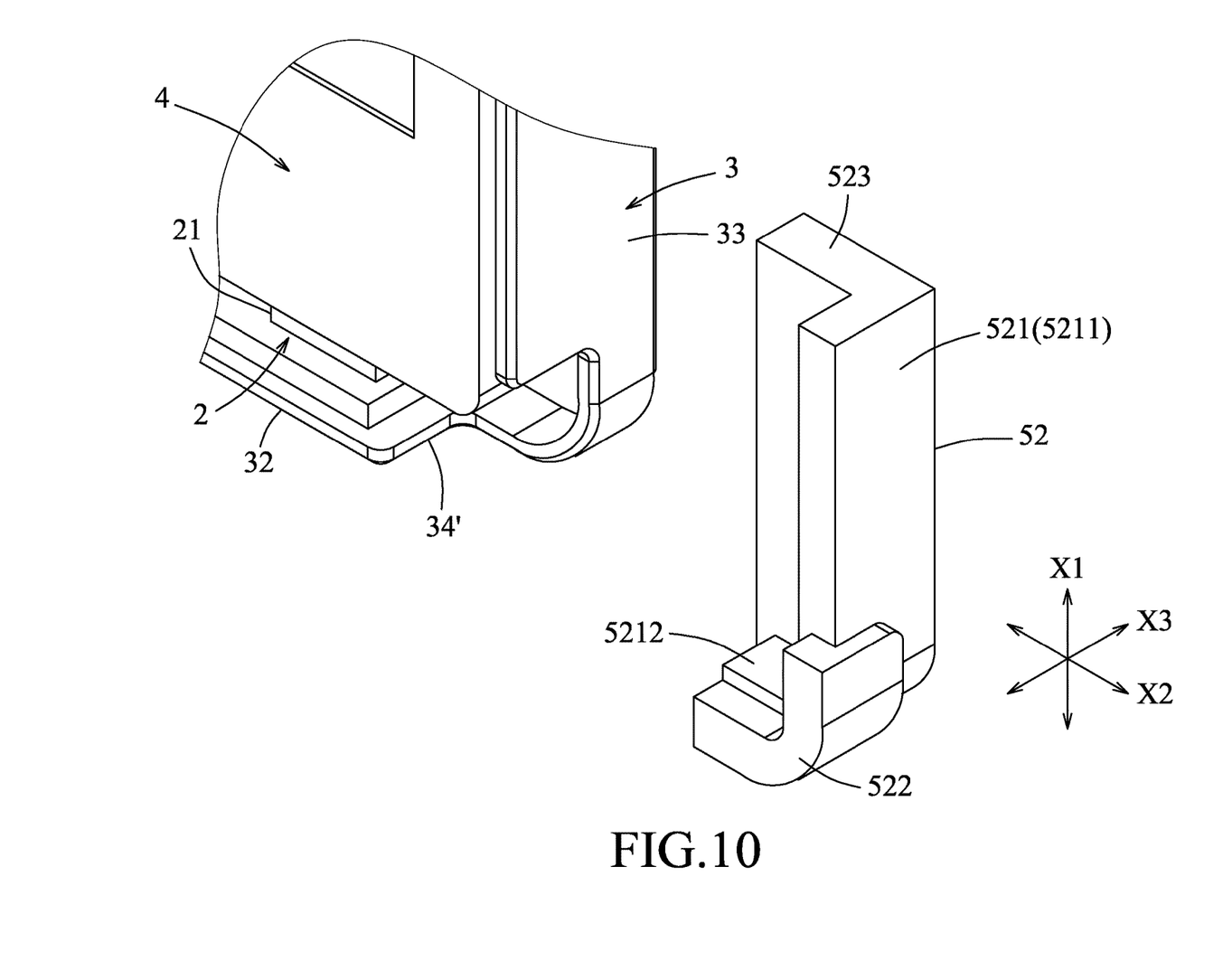
FIG. 10 is a view similar to FIG. 3, but with a second buffer member being removed for the sake of clarity.
Figure 11:
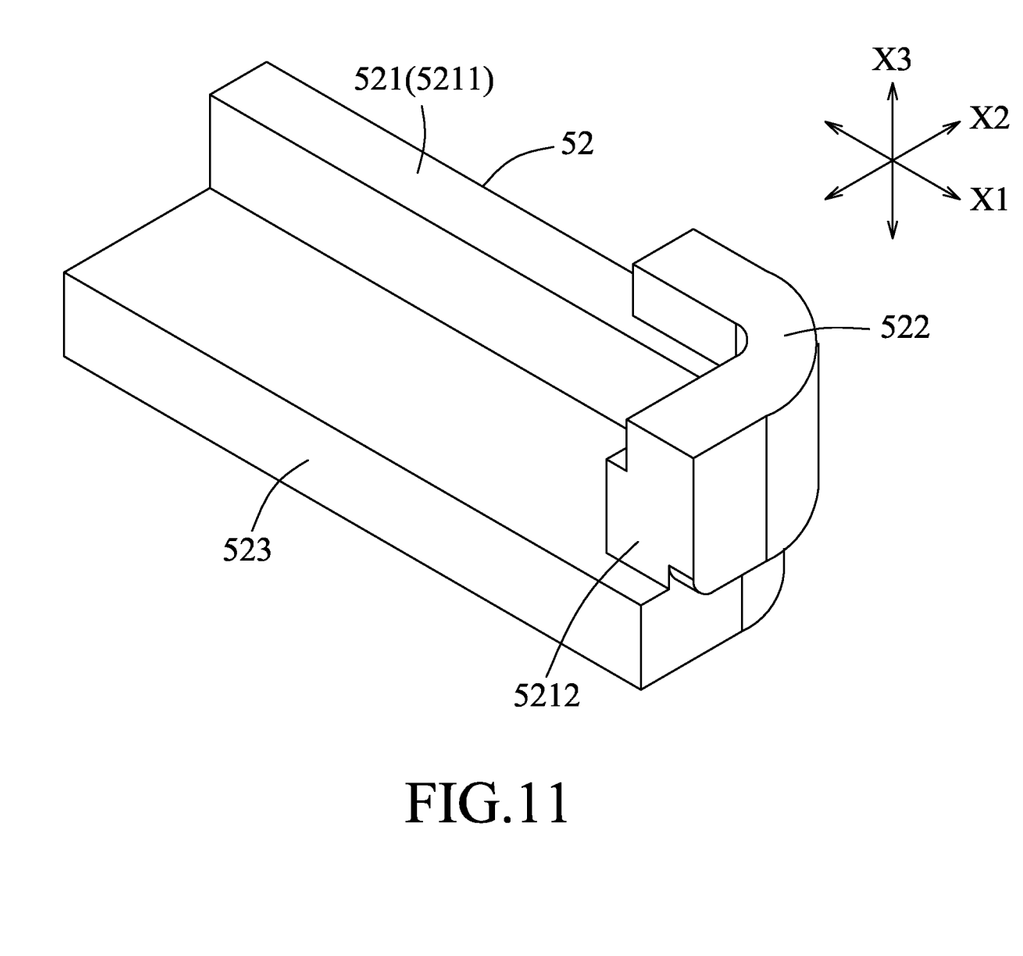
FIG. 11 is a perspective view of the second buffer member of the embodiment.

Referring to FIGS. 5, 6 and 10, in combination with FIG. 4, the buffer assembly 5 includes two first buffer members 51 disposed on the first side 31 of the back plate 3, and two second buffer members 52 disposed on the second side 32 of the back plate 3.

It is worth noting that, although the number of each of the first and second buffer members 51, 52 in this embodiment is two, in other embodiments, the number of each of the first and second buffer members 51, 52 may be one, three or more.

The first buffer members 51 are respectively disposed in the recesses 34, while the second buffer members 52 are respectively disposed in the recesses 34'.

With reference to FIGS. 2 and 5 to 9, each first buffer member 51 has an L-shaped first main body 511 including a horizontal plate 5111 and a vertical plate 5112, and a first engaging portion 512 extending outwardly from an outer surface of the first main body 511 at a junction of the horizontal and vertical plates 5111, 5112 thereof.

The first main body 511 is L-shaped to match the shape of an upper edge of the optical member 4, and is used to surround the portion of the optical member 4 that is adjacent to the junction of the first side 31 and the corresponding third side 33 of the back plate 3. The first engaging portion 512 has an arcuate shape that matches that of the corresponding recess 34 for engagement therewith.

With reference to FIGS. 3 and 10 to 14, each second buffer member 52 has an L-shaped second main body 521 including a horizontal plate 5211 and a vertical plate 5212, a second engaging portion 522 extending outwardly from a lateral surface of the second main body 521 at a junction of the horizontal and vertical plates 5211, 5212 thereof, and an extension portion 523 connected to another lateral surface of the second main body 521 that is opposite to the second engaging portion 522.

Figure 7:
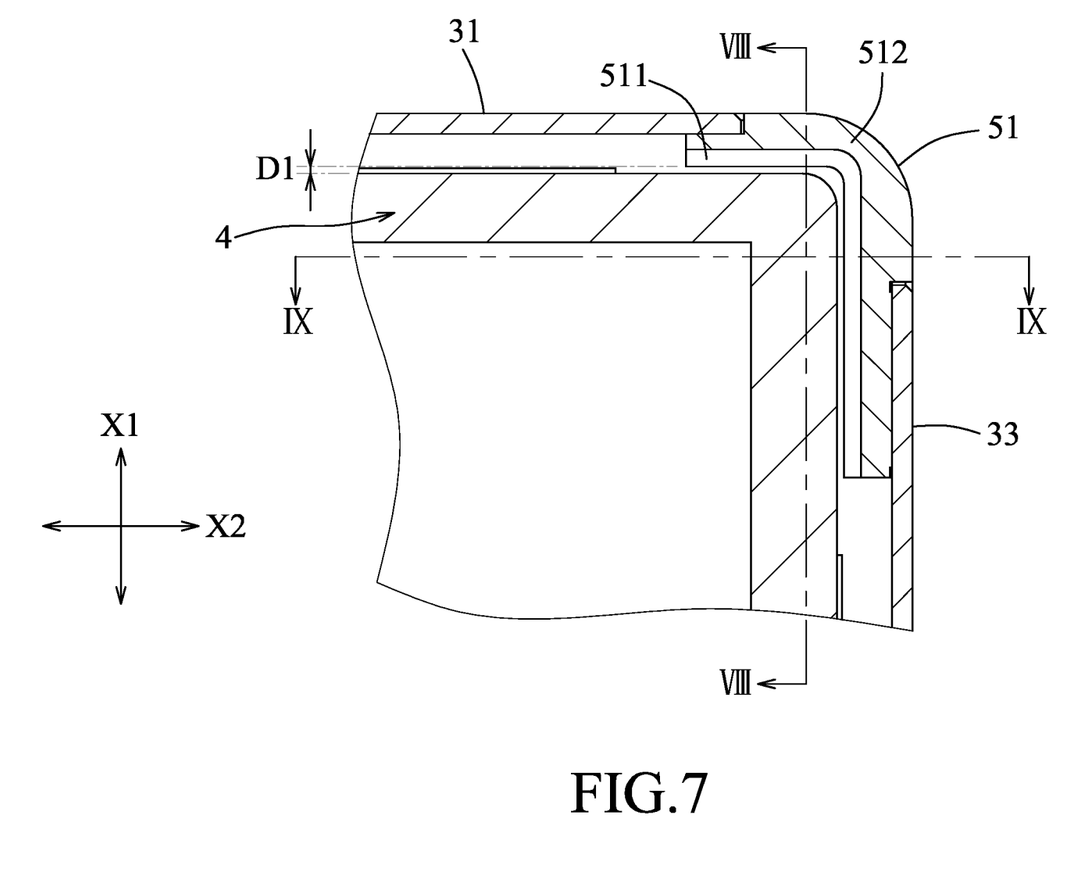
FIG. 7 is a sectional view taken along line VII-VII of FIG. 2.
Figure 8:
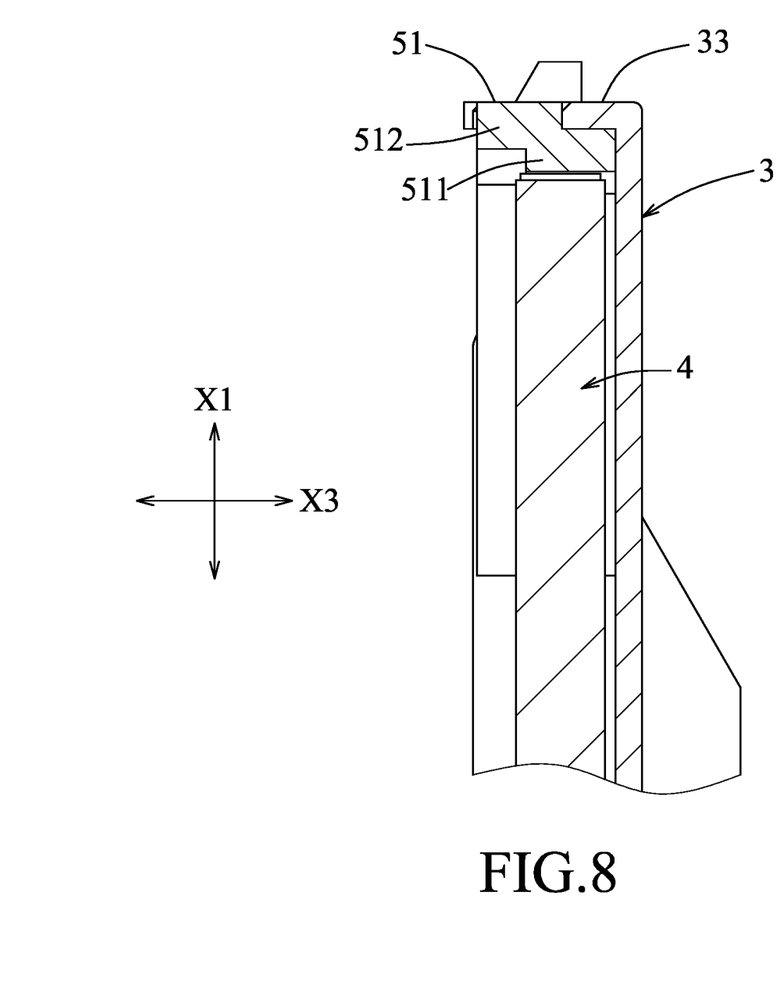
FIG. 8 is a sectional view taken along line VIII-VIII of FIG. 7.
Figure 9:
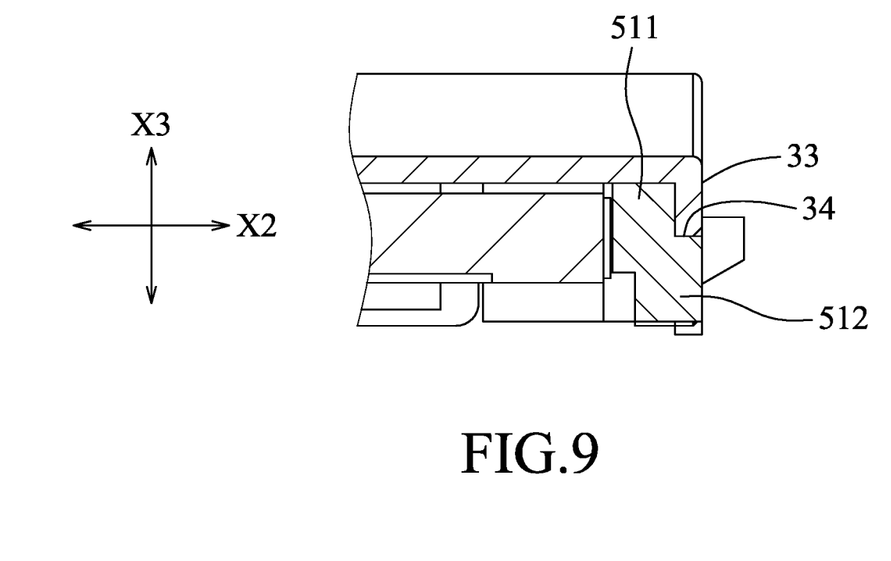
FIG. 9 is a sectional view taken along line IX-IX of FIG. 7.
Figure 12:
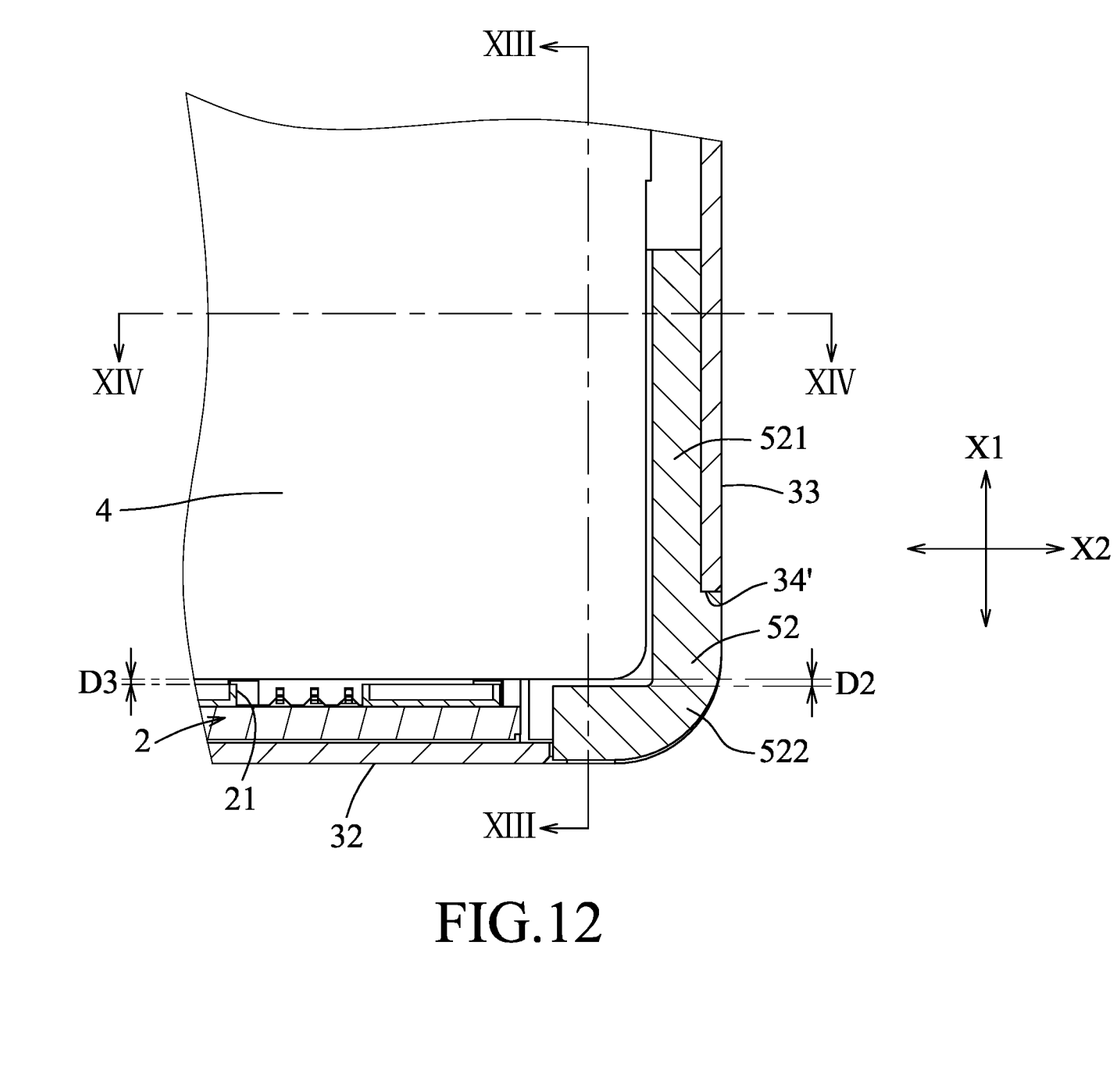
FIG. 12 is a sectional view taken along line XII-XII of FIG. 3.
Figure 13:
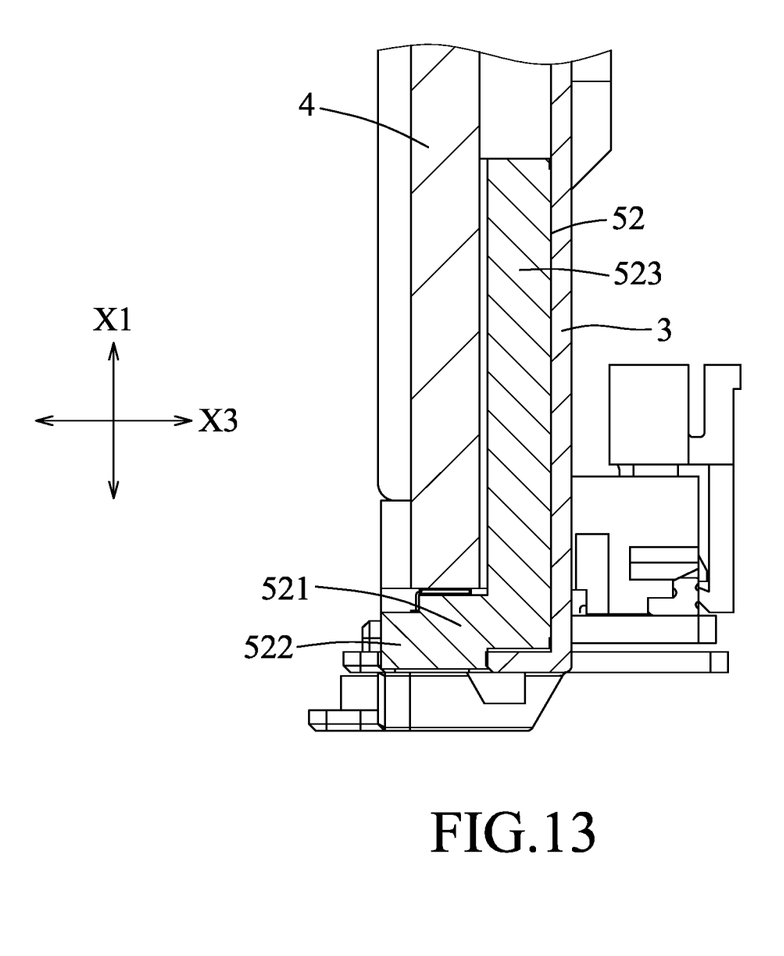
FIG. 13 is a sectional view taken along line XIII-XIII of FIG. 12.
Figure 14:
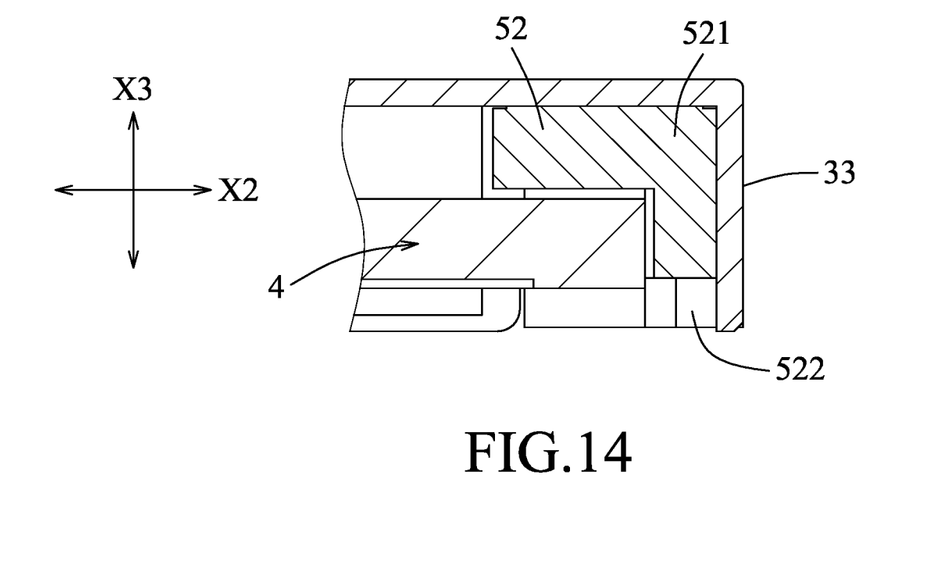
FIG. 14 is a sectional view taken along line XIV-XIV of FIG. 12.

The second main body 521 is L-shaped to match the shape of a lower edge of the optical member 4, and is used to surround the portion of the optical member 4 that is adjacent to the junction of the second side 32 and the corresponding third side 33 of the back plate 3. The second engaging portion 522 has an arcuate shape that matches that of the corresponding recess 34' for engagement therewith. The extension portion 523 forms an angle with the second main body 521, and when the second buffer member 52 is mounted to the back plate 4, the extension portion 523 abuts against the back plate 3. With reference to FIGS. 7 and 12, with the first and second engaging portions 512, 522 engaged to the corresponding recesses 34, 34', with the shapes of the first and second main bodies 511, 521 matching the shapes of the corresponding upper and lower edges of the optical member 4, and with the first and second main bodies 511, 521 surrounding the corresponding portions of the optical member 4, the first and second buffer members 51, 52 can be fixed to the back plate 3. Hence, during transport of the back plate unit 1, the optical member 4 will not be displaced in the first direction (X1) or the second direction (X2) due to shaking, or be deformed due to squeezing by the back plate 3. Furthermore, because the extension portion 523 of each second buffer member 52 abuts against the back plate 3 when each second buffer member 52 is mounted to the back plate 3, the optical member 4 can be further prevented from being displaced along the third direction (X3).

In this embodiment, each first buffer member 51 is made of a thermoplastic material, and each second buffer member 52 is made of a thermoset material.

Each first buffer member 51 and the optical member 4 are deformed when heated, and each first buffer member 51 is squeezed and compressed by expansion of the optical member 4. Since the expansion amount of the optical member 4 can be absorbed by each first buffer member 51, a reserved gap between each first buffer member 51 and the optical member 4 can be reduced, thereby achieving the effect of increasing a screen-to-body ratio of the display device.

More specifically, the first main body 511 of each first buffer member 51 and the optical member 4 have a first gap (D1) (i.e., the reserved gap) therebetween, and the second main body 521 of each second buffer member 52 and the optical member 4 have a second gap (D2) therebetween. When the optical member 4 is heated and expands in the first direction (X1), and the expansion amount thereof is greater than the sum of the first gap (D1) and the second gap (D2) (i.e., D1+D2), since each second buffer member 52 is made of a thermoset material, an excess elongation of the optical member 4 (the part of the elongation greater than D1+D2) will extend toward the first side 31 and squeeze the first buffer members 51, so that the first buffer members 51 are compressed due to the elongated deformation of the optical member 4.

Additionally, in this embodiment, the first and second buffer members 51, 52 are rubbers. In a temperature range, each first buffer member 51 can be deformed by an external force. Under the same temperature and subjected to the same magnitude of external force, a compression deformation amount of each first buffer member 51 is greater than a compression deformation amount of each second buffer member 52. Considering the operating temperature range of the display device, the temperature range of this embodiment is 25° C. to 70° C.

For example, referring to the two tables below, it can be seen that, at the same temperature and under the same external force, a compression deformation amount of the first buffer member 51 is greater than a compression deformation amount of the second buffer member 52. Further, the compression amount of the second buffer member 52 does not change along with external force, while the compression amount of the first buffer member 51 will increase with the increase of temperature, so that a positive correlation is established. It is worth noting that the compression deformation amount shown in each table below is the length when no force is applied minus the length after the external force is applied.

|  | Applied external force (kgw) | | | | |
| --- | --- | --- | --- | --- | --- |
|  | No force | 2 | 4 | 6 | 8 | 10 |
| Temperature 25° C. | | | | | | |
| Length of first buffer member (mm) | 1 | 0.87 | 0.79 | 0.68 | 0.62 | 0.58 |
| Compression deformation amount (mm) | | 0.13 | 0.21 | 0.32 | 0.38 | 0.42 |
| Length of second | 1 | 0.96 | 0.91 | 0.85 | 0.82 | 0.78 |

-continued

| | Applied external force (kgw) | | | | | |
|---|---|---|---|---|---|---|
| | No force | 2 | 4 | 6 | 8 | 10 |
| buffer member (mm) Compression deformation amount (mm) Temperature 70° C. | | 0.04 | 0.09 | 0.15 | 0.18 | 0.22 |
| Length of first buffer member (mm) | 1 | 0.87 | 0.70 | 0.60 | 0.53 | 0.42 |
| Compression deformation amount (mm) | | 0.13 | 0.3 | 0.40 | 0.47 | 0.58 |
| Length of second buffer member (mm) | 1 | 0.96 | 0.91 | 0.85 | 0.82 | 0.78 |
| Compression deformation amount (mm) | | 0.04 | 0.09 | 0.15 | 0.18 | 0.22 |

Referring back to FIGS. 1 and 12, the light emitting unit 2 includes a plurality of light emitting members 21 disposed on the second side 32 of the back plate 3 and spaced apart from each other in the second direction (X2). Each light emitting member 21 is spaced apart from the optical member 4 in the first direction (X1) by a third gap (D3) for emitting light toward the optical member 4. It is added that, when the light emitting members 21 emit light, they will cause the temperature to rise, so that the optical member 4 expands and elongates.

Specifically, with reference to FIG. 12, in this embodiment, the second gap (D2) between the second main body 521 and the optical member 4 is no greater than the third gap (D3). As such, when the optical member 4 is heated and expands, even if an edge portion of the optical member 4 that is close to the second side 32 of the back plate 3 abuts against the second buffer member 52, the optical member 4 will not press against the light emitting members 21. Moreover, since the second buffer members 52 are made of thermoset materials, they can further prevent the optical member 4 from extending toward the second side 32 to press against the light emitting members 21 when heated.

It is worth to mention herein that, in this embodiment, the first buffer members 51 are disposed on the first side 31 of the back plate 3, while the second buffer members 52 are disposed on the second side 32 of the back plate 3. However, in other variations, the first and second buffer members 51, 52 may be disposed elsewhere on the back plate 3 (for example, the third sides 33). Preferably, the second buffer members 52 are disposed according to the position of the light emitting unit 2, after which the first buffer members 51 are disposed on a side opposite to the second buffer members 52.

In summary, in the back plate unit 1 and the backlight module 100 of this disclosure, by providing the first buffer members 51 made of thermoplastic materials, the first buffer members 51 can be squeezed, compressed and deformed due to expansion of the optical member 4 when heated. In this way, since the first buffer members 51 can absorb the expansion amount of the optical member 4, the reserved gap (D1) between the first buffer members 51 and the optical member 4 can be reduced. Therefore, the object of this disclosure can indeed be achieved.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A back plate unit comprising:
    a back plate having a first side and a second side opposite to each other;
    an optical member mounted to said back plate; and
    a buffer assembly disposed between said optical member and said back plate, said buffer assembly including at least one first buffer member that is disposed on said first side of said back plate, that is located between said back plate and said optical member, and that is made of a thermoplastic material, and at least one second buffer member that is disposed on said second side of said back plate, that is located between said back plate and said optical member, and that is made of a thermoset material;
    wherein said at least one first buffer member and said optical member are deformed when heated, and said first buffer member is squeezed and compressed by expansion of said optical member.

2. The back plate unit as claimed in claim 1, wherein said first side and said second side of said back plate are opposite to each other in a first direction.

3. The back plate unit as claimed in claim 1, wherein said back plate further has two third sides each of which is connected between one end of said first side and a corresponding end of said second side, said at least one first buffer member including two first buffer members, said at least one second buffer member including two second buffer members, each of said first buffer members being disposed on a junction of said first side and a corresponding one of said third sides, each of said second buffer members being disposed on a junction of said second side and a corresponding one of said third sides.

4. The back plate unit as claimed in claim 1, wherein, in a temperature range and under the same temperature and subjected to the same magnitude of external force, a compression deformation amount of said first buffer member is greater than a compression deformation amount of said second buffer member, and the temperature range is 25'C to 70° C.

5. The back plate unit as claimed in claim 1, wherein, in a temperature range, said first buffer member is deformed by an external force, and the temperature range is 25° C. to 70° C.

6. A backlight module of a display device comprising:
    a plate unit as claimed in claim 1; and
    a light emitting unit disposed on said second side of said back plate for emitting light toward said optical member.

7. The backlight module as claimed in claim 6, wherein said light emitting unit includes a plurality of light emitting members spaced apart from each other in a second direction transverse to the first direction, and each of said light emitting members is spaced apart from said optical member in the first direction by a gap.

8. The backlight module as claimed in claim 6, wherein said first side and said second side of said back plate are opposite to each other in the first direction.

9. The backlight module as claimed in claim 8, wherein said back plate further includes two third sides each of which is connected between one end of said first side and a corresponding end of said second side, said at least one first buffer member including two first buffer members, said at least one second buffer member including two second buffer members, each of said first buffer members being disposed on a junction of said first side and a corresponding one of said third sides, each of said second buffer members being disposed on a junction of said second side and a corresponding one of said third sides.

10. The backlight module as claimed in claim 6, wherein, in a temperature range and under the same temperature and subjected to the same magnitude of external force, a compression deformation amount of said first buffer member is greater than a compression deformation amount of said second buffer member, and the temperature range is 25° C. to 70° C.

11. The backlight module as claimed in claim 6, wherein, in a temperature range, said first buffer member is deformed by an external force, and the temperature range is 25'C to 70° C.

\* \* \* \* \*